United States Patent [19]

Hoch

[11] Patent Number: 4,549,765
[45] Date of Patent: Oct. 29, 1985

[54] BRACKET ASSEMBLY FOR ADJUSTABLY MOUNTING A SEAT

[75] Inventor: John J. Hoch, Beaver Dam, Wis.

[73] Assignee: Deere & Company, Moline, Ill.

[21] Appl. No.: 565,313

[22] Filed: Dec. 27, 1983

[51] Int. Cl.⁴ .............................................. A47C 1/02
[52] U.S. Cl. ................................... 297/311; 248/558; 297/445
[58] Field of Search ............ 248/558, 161, 157, 188.2, 248/300, 274, 159; 297/345, 311, 445; 296/65 R

[56] References Cited

U.S. PATENT DOCUMENTS

| | | | |
|---|---|---|---|
| 2,630,360 | 3/1953 | McGinley | 248/188.2 |
| 3,495,794 | 2/1970 | Polk | 248/157 |
| 3,722,011 | 3/1973 | Miller | 248/188.2 |
| 3,841,696 | 10/1974 | Wagner | 296/65 R |
| 4,014,517 | 3/1977 | Keagle | 248/157 |

FOREIGN PATENT DOCUMENTS 2828477  3/1980  Fed. Rep. of Germany ...... 248/558

*Primary Examiner*—Ramon S. Britts
*Assistant Examiner*—Ramon O. Ramirez

[57] ABSTRACT

A bracket assembly constructed according to one embodiment includes a pair of identical L-shaped brackets arranged for selectively positioning a seat at three different heights. An alternate embodiment of the bracket assembly includes a pair of tubular brackets which are rectangular in cross section and optionally mountable to a horizontal frame surface with either their long side or their short side against the surface for selectively positioning a seat in a low or a high position.

13 Claims, 4 Drawing Figures

BRACKET ASSEMBLY FOR ADJUSTABLY MOUNTING A SEAT

BACKGROUND OF THE INVENTION

The present invention relates to a vehicle seat height adjusting mechanism and more specifically relates to a bracket assembly forming such a mechanism.

It is known to provide vehicle seat mountings which are operable for positioning a seat at different desired heights for accommodating operators of different heights. These mountings normally include linkages which may be quickly adjusted to elevate or lower the seat as desired or include a ramp support for permitting the seat to be releasably secured at various positions along the ramp.

Because many tractors are often driven by a limited number of different operators, it is desirable to provide a seat mounting which is more economical than the known mountings while providing an equivalent range of adjustment.

SUMMARY OF THE INVENTION

According to the present invention there is provided a novel bracket assembly for mounting a seat for vertical adjustment.

An object of the invention is to provide a simple, economical to manufacture bracket assembly capable of disposing a seat at various selected heights.

A more specific object is to provide a bracket assembly comprising first and second parallel spaced brackets which are capable of being mounted to a support frame in arrangements for supporting a seat at different heights.

Yet another object of the invention is to provide a bracket assembly including a pair of brackets either in the form of L-shaped plates or tubes of rectangular cross section which may be mounted to a support frame in different orientations resulting in seat mounting surfaces being located at least at two different heights.

These and other objects, features and advantages of the present invention will become apparent to those skilled in the art from the description which follows and from the drawings.

DESCRIPTION OF THE PREFERRED EMBODIMENT

Figure 1:
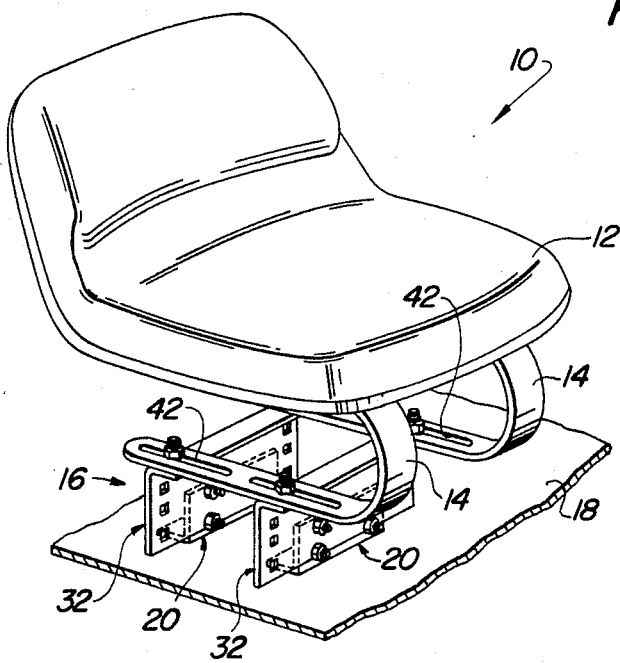
FIG. 1 is a perspective view showing a tractor seat mounted in accordance with the present invention.

Referring now to FIG. 1, there is shown a seat assembly 10 including a contoured cushion 12 mounted to upper free end portions of a pair of reverse curved flat springs 14. The springs 14 have lower ends secured to a vertically adjustable bracket assembly 16 which is mounted to a flat surface of a frame 18.

Figure 2:
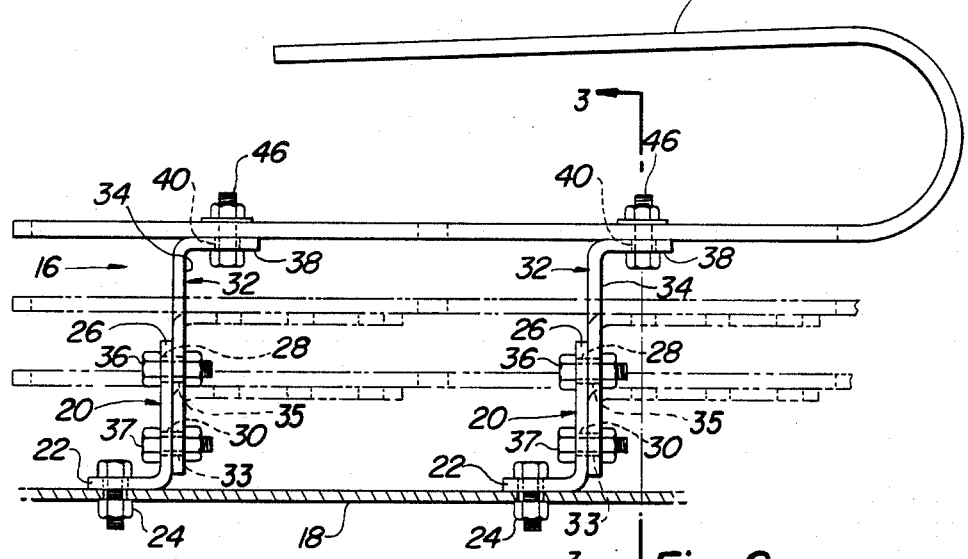
FIG. 2 is a right side elevational view of the bracket assembly for supporting the seat shown in FIG. 1 with the assembly being shown in solid and two sets of broken lines, respectively for supporting the seat at high, intermediate and low positions.
Figure 3:
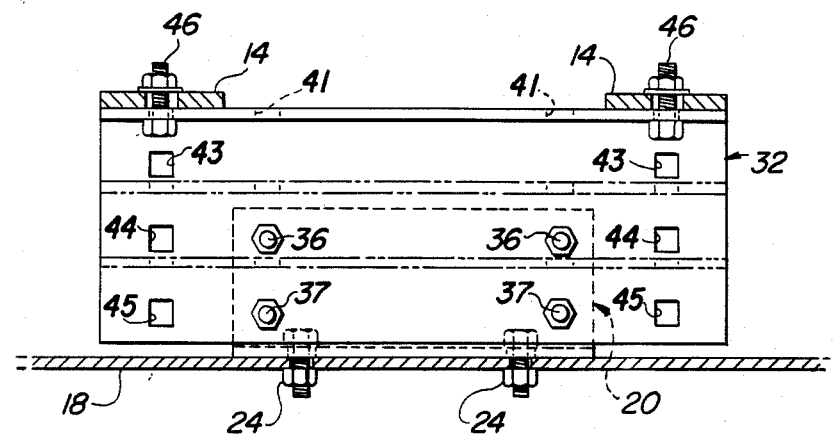
FIG. 3 is a vertical sectional view taken along lines 3—3 of FIG. 2.

As can best be seen in FIGS. 2 and 3, the frame 18 includes a pair of identical brackets 20 formed from L-shaped plate members. The brackets 20 extend transversely and are longitudinally spaced from each other. Each bracket 20 has a horizontal first leg 22 positioned against the bolted to the flat surface of the frame 18 by a pair of bolts 24. The brackets 20 each have a vertical second leg 26 provided with upper and lower pairs of transversely spaced mounting holes 28 and 30, respectively. The bracket assembly 16 includes a pair of identical seat mounting brackets 32 also formed from identical L-shaped plate members. The seat mounting brackets 32 are longer than the brackets 20. With the bracket assembly 16 in its high position shown in solid lines, the brackets 32 are respectively arranged with first legs 34 secured to the vertical legs 26 of the brackets 20 by a first pair of bolts 37 received through a lower pair of holes 33 provided in each of the legs 34 and the lower pair of holes 30 of the legs 26 and by a second pair of bolts 36 received through an upper pair of holes 35 provided in each of the legs 34 and the upper holes 28 provided in the legs 26. The brackets 32 have second, relatively short legs 38 which are each provided with an outer pair of transversely spaced holes 40 and an inner pair of transversely spaced holes 41. The lower ends of the springs 14 overlie the legs 38 and pairs of bolts 46 are received through slots 42 in the springs and the pairs of holes 40.

The low position of the bracket assembly 16 is achieved by disconnecting the brackets 32 both from the springs 14 and the brackets 20. The brackets 32 are then rearranged with their short legs 38 respectively positioned against and secured to the legs 26 of the brackets 20 by the pairs of bolts 37, which are received in the lower pairs of holes 30 of the brackets 20 and in the holes 41 in the brackets 32. The pair of bolts 46, are then inserted in a selected pair of three pairs of holes 43, 44 and 45 (from top to bottom in FIG. 3) of the brackets 32 and in the slots 42 in the springs 14.

The intermediate position of the bracket assembly 16 is achieved by removing the pairs of bolts 37 from the lower pairs of holes 30 of the brackets 20, raising the brackets 32 and reinserting the bolts 37 through the upper pairs of holes 28 of the brackets 20.

When the bracket assembly 16 is in other than its high position, the bolts 36 may be stored in the unused holes of the brackets 20.

Figure 4:
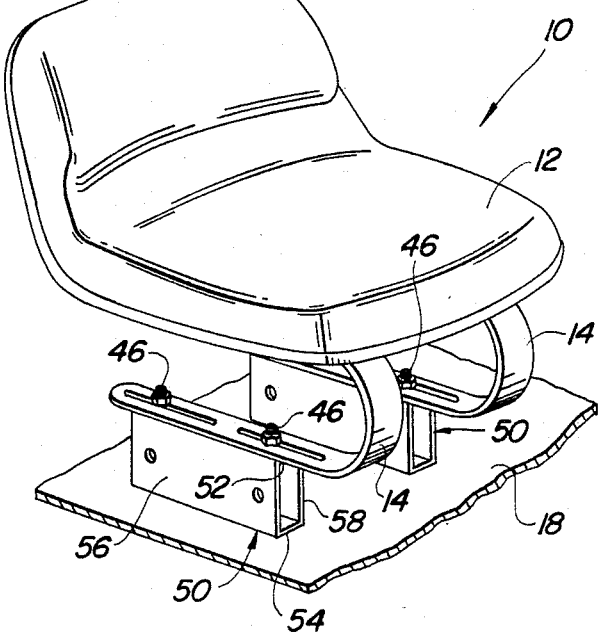
FIG. 4 is a view like FIG. 1 but showing an alternate bracket assembly.

Referring now to FIG. 4 there is shown an alterate embodiment of the seat assembly 10 wherein the brackets 20 are omitted and the pair of seat mounting brackets 32 are replaced by a pair of brackets 50 formed from identical tubes of rectangular cross section. The pair of brackets 50 extend fore-and-aft beneath and are releasably connected to the springs 14 by the bolts 46. In the position of the brackets 50 shown in FIG. 4, the bolts 46 are received in openings provided in a narrow first side 52 of each of the brackets while an opposite narrow side 54 is secured to the frame 18 by the bolts 24 (not visible). Opposite wide sides 56 and 58 extend between the narrow sides so as to dispose the seat 12 at a desired high position. The seat 12 may be placed in a low position by disconnecting the brackets 50 from the springs 14 and the frame 18 and then by securing the springs to the wide sides 56 of the brackets and by securing the wide sides 58 of the brackets to the frame 18.

I claim:

1. A bracket assembly supporting a seat, comprising: a support frame; first and second parallel spaced brackets which each include first and second flat surfaces being joined together at right angles to each other, and provided with mounting holes; first and second mounting means for selectively mounting the first and second brackets to the support frame in first and second positions respectively wherein in said first position the first flat surfaces on said brackets are horizontal and in said second position the second flat surfaces on said brackets are horizontal; said first and second bracket means each being dimensioned such that the height of said first flat surfaces when the second flat surfaces are horizontal is greater than the height of the second flat surfaces when the first flat surfaces are horizontal; and releasable means for securing the seat to whichever one of the first and second flat surfaces that is disposed horizontal, whereby the seat may be disposed at least at two different heights by rearranging the first and second bracket means.

2. The bracket assembly defined in claim 1 wherein said first and second parallel spaced brackets extend transversely and each includes an L-shaped plate having first and second legs of different lengths with the first and second legs of each plate respectively including said first and second flat surfaces; said frame including first and second parallel transverse vertical mounting surfaces; and said first and second mounting means each including releasable fasteners for selectively securing one of the first and second legs of the first L-shaped plate to the first vertical mounting surface and for selectively securing one of the first and second legs of the second L-shaped plate to the second vertical mounting surface.

3. The bracket assembly defined in claim 2 wherein the first leg of each L-shaped plate is longer than the second leg and when the first legs of the first and second L-shaped plates are respectively secured to the first and second vertical mounting surfaces, the second legs are located at a predetermined upper mounting height; and said second legs of the first and second L-shaped plates being selectively mountable to the first and second vertical mounting surfaces at a pair of vertically spaced locations wherein said first legs are respectively located at predetermined intermediate and lower heights, whereby the seat may be selectively disposed at three different levels.

4. The bracket assembly defined in claim 3 wherein said frame includes a flat horizontal platform and a pair of identical parallel, transverse L-shaped plates having first legs secured to the platform and second legs defining said first and second vertical mounting surfaces.

5. The bracket assembly defined in claim 2 wherein said seat includes a cushion and a pair of transversely spaced, fore-and-aft extending, reverse bent flat springs having first portions secured to the cushion and having second portions extending over the first and second L-shaped plates; and said releasable means comprising a pair of fasteners associated with each flat spring and respectively securing the latter to whichever one of the first and second legs of each plate that is disposed horizontally.

6. The bracket assembly defined in claim 1 wherein said first and second parallel spaced brackets respectively include first and second tubes which are each rectangular in cross section with first and second sides of each tube defining said first and second flat surfaces and with third and fourth sides of each tube being opposite said first and second sides; and said first mounting means including at least two releasable fasteners for selectively releasably securing either the third or the fourth sides of the tube to the frame to thereby dispose the first and second sides at first and second preselected heights determined by the cross-sectional dimensions of the tube.

7. The bracket assembly defined in claim 6 wherein said tubes extend fore-and-aft and said seat includes a pair of strap springs having portions respectively disposed above and releasably secured to said tubes.

8. A bracket assembly for supporting a seat, comprising: a support frame including a pair of transversely extending, longitudinally spaced upright mounting surfaces, each having a plurality of vertically spaced sets of mounting holes therein; a bracket means defined by first and second transverse brackets, each having first and second legs of different lengths joined together to form a right angle with the shorter of the first and second legs being provided with at least one set of mounting holes arranged for selectively mating with said plurality of spaced sets of mounting holes provided in said upright mounting surfaces, and with the longer of the first and second legs being provided with a set of mounting holes arranged for selectively mating with selected ones of said plurality of spaced sets of mounting holes provided in said upright mounting surfaces; and a plurality of fasteners releasably securing one of the first and second legs of each of the transverse brackets to a selected one of the pair of upright mounting surfaces.

9. The bracket assembly defined in claim 8 wherein said frame includes first and second L-shaped brackets with the pair of upright mounting surfaces being respective first legs of the first and second brackets.

10. The bracket assembly defined in claim 9 wherein the frist and second L-shaped brackets are identical.

11. The bracket assembly defined in claim 9 wherein said bracket means comprises third and fourth L-shaped brackets.

12. The bracket assembly defined in claim 8 wherein two vertically spaced sets of mounting holes are provided in each of the pair of upright mounting surfaces and each set comprises a pair of transversely spaced holes.

13. In a seat assembly including a seat cushion having a pair of transversely spaced, longitudinally extending, reverse curved springs secured to a lower surface thereof and a bracket assembly connecting the springs to a support frame, the improvement comprising: said frame including a pair of identical, L-shaped brackets spaced longitudinally from each other and having respective horizontal, transverse legs secured to said frame and having respective vertical legs, each vertical leg being provided with first and second sets of vertically spaced mounting holes; a pair of identical, L-shaped seat mounting brackets having first and second legs of different lengths with the shorter legs being provided with a first set of mounting holes arranged to mate with either of the sets of mounting holes provided in the first-mentioned L-shaped brackets, and with the longer of the legs being provided with a set of mounting holes arranged for simultaneously mating with both of the sets of mounting holes provided in the first-mentioned L-shaped brackets; releasable fasteners selectively securing one of the legs of the seat mounting bracket to the first-mentioned L-shaped bracket and the other of the legs of the seat mounting bracket to the spring.

* * * * *